United States Patent [19]
Chaum

[11] Patent Number: 5,959,717
[45] Date of Patent: Sep. 28, 1999

[54] MOTION PICTURE COPY PREVENTION, MONITORING, AND INTERACTIVITY SYSTEM

[76] Inventor: Jerry Chaum, 14652 Sutton St., Sherman Oaks, Calif. 91403

[21] Appl. No.: 08/989,737

[22] Filed: Dec. 12, 1997

[51] Int. Cl.$^6$ .................................................. G03B 21/32
[52] U.S. Cl. ............................... 352/40; 352/55; 352/90; 352/133
[58] Field of Search .................................. 352/38, 40, 41, 352/55, 90, 133

[56] References Cited

U.S. PATENT DOCUMENTS

| | | | |
|---|---|---|---|
| 1,260,221 | 3/1918 | McCormick | 352/40 |
| 4,461,552 | 7/1984 | Levine | 352/27 |
| 4,666,271 | 5/1987 | Gonsot | 352/90 |
| 4,739,396 | 4/1988 | Hyatt | 358/60 |
| 5,303,294 | 4/1994 | Kimoto et al. | 380/5 |
| 5,317,689 | 5/1994 | Nack et al. | 395/163 |
| 5,428,417 | 6/1995 | Lichenstein | 353/122 |

*Primary Examiner*—Russell Adams
*Attorney, Agent, or Firm*—Fish & Richardson P.C.

[57] ABSTRACT

A combination film projector and video projector for showing a single composite motion picture, and a motion picture audience monitoring system. The video projector is used to provide image content for a video display subarea on the projected film image. Thus, all of the light output of the video projector is focused on a substantially smaller subarea of the screen. Uses of the combination of both a film projector and video projector include theft deterrence and special effects. Another aspect includes a motion picture audience monitoring system including a camera and/or microphone directed at the audience and coupled to an analysis system. The audience monitoring system can be used to obtain demographic information about the attending audience. The system can be used in conjunction with a pattern recognition system to determine such information. The output of the analysis system may be used in conjunction with the video source to provide a feedback system coupled to the film projector or video projector to alter the motion picture content in response to such feedback. Another aspect includes using a camera or microphone to provide a signal to the video source from which a synchronization signal can be derived. An alternative function for the camera would be to capture the projected image and provide a feedback video signal sufficient to measure characteristics of the projected image and adjust the output of the video projector accordingly.

16 Claims, 6 Drawing Sheets

MOTION PICTURE COPY PREVENTION, MONITORING, AND INTERACTIVITY SYSTEM

TECHNICAL FIELD

This invention relates to film and electronic projection of images, and more particularly to a combination of film and video projection systems.

BACKGROUND INFORMATION

Public screenings of motion pictures have long been dominated by film projection systems. Despite the advancement of electronic video projection systems, such as LCD-based video projectors, it appears likely that film projection of motion pictures will continue to be popular for some time. Film projection provides high brightness, high contrast, and high resolution projection of motion pictures, while present digital systems generally are deficient in these characteristics. Accordingly, it is believed that film will continue to appeal to film purists in the industry and to film-loving audiences. Further, there has been a huge investment in current technology, and an enormous investment would be required to change to non-film technology.

A problem in the motion picture industry is film piracy, which may be of several sorts. One form of piracy is the theft of motion picture film in order to create video tape copies for sale on worldwide black markets. A second form of piracy involves surreptitiously imaging a projected motion picture at a public theater using a video camera, in order to produce low quality copies of current release films for video tape black markets.

Other problems facing the motion picture theater industry are lack of adequate methods of determining audience demographics (e.g., audience counts, age distribution, sex distribution, eating and sitting habits, etc.), and the need to create interactivity and special effects to enhance competitiveness with home entertainment.

The inventors have determined that it would be desirable to solve these problems in an economical fashion that provides additional side benefits. The present invention provides a solution to these problems in just such a fashion.

SUMMARY

One aspect of the invention includes a combination film projector and video projector for showing a single composite motion picture. The video projector is coupled to a video source. The video projector is used to provide image content for a video display subarea on the projected film image. The video projector need not have sufficient illumination power, contrast, and resolution to provide an acceptable projected image of a motion picture that fills an entire screen. Rather, all of the light output of the video projector is focused on a substantially smaller subarea of the screen. Uses of the combination of both a film projector and video projector include theft deterrence due to difficulties of copying, and special effects due to the dynamics and interactivity of digital media.

For theft deterrence, a motion picture may be provided in two parts—a film component and a video component. The film component may have a selected portion—a "protection area"—of selected frames omitted. Conversely, the video projector is provided with a video signal that provides image content for the protection area omitted from the film version of the motion picture. Copy protection is improved because a thief would have to steal both components in order to display a complete motion picture. Pirated copies of the film would have "holes" in the video content unless the thieves managed to also steal and use the video component of the motion picture. In an alternative embodiment, the two parts may comprise first and second video components. Other theft deterrence aspects of the invention include the following:

The protection area may include an alert message or symbol that is camouflaged by the output of the video projector. For example, "positive" or "negative" images can be "punched out" from a full color film image, and the missing image information supplied by the video component (either concurrently or in rapid succession), so that when the composite image is "integrated" by the eye, the protection area becomes invisible on the screen, no matter where positioned. A video camera or media thief may have access to only some of the images and thus only a copy with the visible alert message.

Theft of the video component can be made more difficult or impossible by shipping a video version separately from the film version of the motion picture.

Theft of the video component can be made impossible by providing a video signal to a motion picture theater from a remote site through a telecommunications link.

If a removable media is used to provide the content for the video projector, it may desirable to conform the video media so that it only works with a specific film copy of a motion picture.

The video media may be erasable or alterable so that the video source can only play the video media a pre-set number of times.

In all of the embodiments in which an alert message is used, the message may be a time and place "stamp" useful in attempting to track down in-theater video thieves by backtracking recovered pirated video tapes to a particular copying source. Alternatively, the alert messages can say things like "CALL XXX-XXXX FOR A REWARD", where the telephone number could be dynamic depending on the screening. A static message about copyright law enforcement could also be used, possibly customized by country.

For special effects, the combination of one of a film or video projector, plus a video projector, may be used to provide augmentations to conventional special effects or may vary the content of the motion picture. Special effects aspects of the invention include the following:

A single film can have different ratings by adding film elements using the video projector.

A film scene can be altered to provide different content, such as advertising or local language versions of text.

Such special effects as the use of the video image to enhance the brightness, resolution, or speed of, for example, an animated character or "magic sparkle" that moves around the screen.

In another aspect, the invention includes a method and apparatus for displaying a composite image, including projecting a first image having at least one portion of the image altered to provide at least one protection area; and projecting separately a second image having image content to obscure each protection area; wherein the first image and second image form a composite image in which each protection area is essentially invisible to the human eye.

Another aspect of the invention includes a motion picture audience monitoring system. The output of a camera and/or microphone (with the movie soundtrack possibly electronically canceled) is coupled to an analysis system, the output of which is optionally coupled to the video source described above. The audience monitoring system can be used to obtain demographic information about the attending audience. The system can be used for "manned" monitoring, but is preferably used in conjunction with a pattern recognition system to determine a variety of factors about the audience. The output of the analysis system may be used in conjunction with the video source to provide a feedback system coupled to the film projector or video projector. Monitoring aspects of the invention include the following:

- If the analysis system can determine the attendance for the audience, that information can be recorded and/or provided to remote sites and/or provided to the video source and projected by the video projector some time before, during, or after the projection of a motion picture.
- The image taken by the camera may be re-projected through the video projector onto a screen so that, for example, the audience may see itself, a function that seems to be popular at sporting events. Alternatively, lottery-style choice of a person in the audience could be made, with the image of the selected person enlarged and projected.
- Demographic information obtained by the camera and analysis system can be used to alter the content displayed by the video projector. Thus, the video projector can be used to provide or augment images in order to provide variable plot or scene elements depending upon the characteristics of the audience.
- An authorization technology may be used with the audience monitoring system to positively allow a central site to authorize display of a complete motion picture based upon confirmation that the motion picture is being displayed at an authorized site before a legitimate audience. Such authorization may be done on a per screening basis.

Another aspect of the invention includes a feedback system using a camera or microphone or soundtrack sound and/or data output from a film projector to provide a signal to the video source from which a synchronization signal can be derived. An alternative function for the camera would be to capture the projected image on a screen and provide that image to a processor within the video source. The processor can use the video signal from the camera to measure the brightness, color balance, alignment, planarity, focus, etc. of the projected image and adjust the output of the video projector.

The details of the preferred embodiment of the invention are set forth in the accompanying drawings and the description below. Once the details of the invention are known, numerous additional innovations and changes will become obvious to one skilled in the art.

DESCRIPTION OF DRAWINGS

Like reference numbers in the various drawings indicate like elements.

DETAILED DESCRIPTION

Throughout this description, the preferred embodiments and examples shown should be considered as exemplars, rather than as limitations on the present invention.

Figure 1:
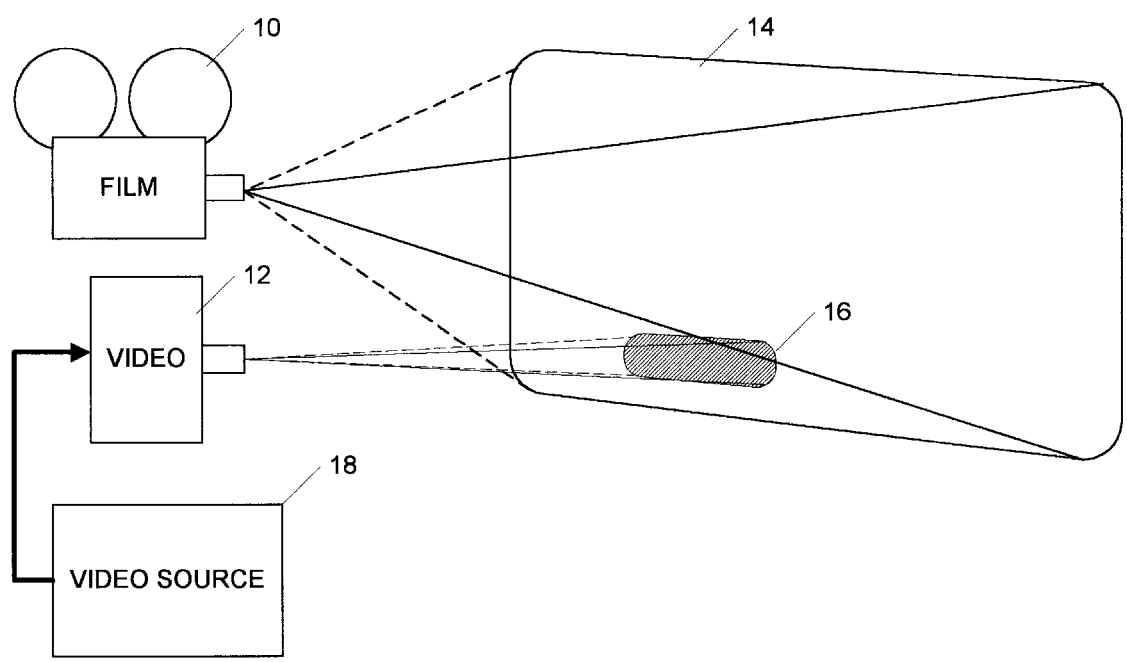
FIG. 1 is a block diagram showing a first preferred embodiment of the present invention.

FIG. 1 is a block diagram showing a first preferred embodiment of the present invention. One aspect of the invention includes a combination film projector 10 and video projector 12 for showing a single composite motion picture 14. In particular, the video projector 12 is used to provide image content for a video display subarea 16 on the projected film image. As will be described in further detail below, the combination of both a film projector 10 and video projector 12 provides a number of benefits. In an alternative embodiment, the two projectors may comprise first and second video projectors. In an alternative embodiment, multiple projectors of the same or different technologies may be used.

The film projector 10 is conventional. It is contemplated that existing equipment used by motion picture theaters could be retained and used as part of the inventive combination. The video projector 12 is preferably of a high brightness, high contrast, high resolution type, and may be based, for instance, on the use of LCD, light-valve, digital mirror, CRT, laser, or functionally equivalent technology. The video projector 12 may have either an analog input (e.g., an input conforming to the NTSC television standard for the U.S., or the PAL television standard for Europe), or a digital input (e.g., for MPEG-II data streams). The video projector 12 is coupled to a video source 18, such as a DVD video disk player or computer containing a DVD decoder, and may be local (i.e., situated at a specific motion picture theater site) or partly remote (e.g., coupled to the video projector 12 by means of a high speed communication link, such as a T1 or T3 telecommunications line, a video transmission cable, or a satellite link). The video projector 12 and the film projector 10 are synchronized. One synchronization technique is to optically or magnetically encode a timing track on the film media that is readable by a suitable transducer, in known fashion. Other synchronization techniques are described below. It desired, the audio may be supplied by the video source media.

An advantage of the configuration shown in FIG. 1 is that the video projector 12 need not project an image that fills the entire screen. That is, the video projector 12 may concentrate all of its light output to a more limited area video display subarea 16. Accordingly, it is believed that projector 12 can acceptably approximate or even exceed the brightness, speed and resolution of film. The video display subarea 16 may be imaged in a fixed location, or may vary in position over time, as described further below.

If a single video projector 12 has insufficient brightness even for the small video display subarea 16 required to be illuminated by its image, multiple video projectors may be used to provide an overlapping composite, brighter image. Alternatively, the light output from each video projector may be used to illuminate smaller areas (which may be adjacent or separated), resulting in a higher perceived brightness for those areas. Plural video projectors may be used, if desired or necessary.

One aspect of the invention is that by simply providing a motion picture in two or more parts, copy protection is improved because a thief would have to steal all components in order to display a complete motion picture. For example, the film version of a motion picture may have a selected portion of each frame (or of periodically or randomly spaced frames) omitted. The omitted portion of the film—a "protection area"—may be in a regularly-shaped area or an irregularly-shaped area. Examples include a circle or square, or something that looks like television station symbols that are commonly inset into cable television. Conversely, the video projector 12 is provided with a video signal that provides image content for the protection area omitted from the film version of the motion picture. Thus, for example, referring to FIG. 1, the film version of a motion picture may show an entire motion picture image 14 except for the video display subarea 16, which may be, for example, an all-black area. Conversely, the video projector 12 provides image information only for the video display subarea 16. The location of the video display subarea 16—the protection area—may vary from frame to frame and need not be used in every frame. Accordingly, theft of the film version of the motion picture would mean that pirated copies would have "holes" or black areas in the video content unless the thieves managed to also steal and use the video component of the motion picture. Theft of the video component can be made more difficult by shipping a video version (e.g., a DVD media disk) separately from the film version of the motion picture. Alternatively, theft can be made impossible by providing all or part of a video signal to a motion picture theater from a remote site through a telecommunications link, so that no physical copy of the video component of the motion picture is present in the same distribution channel used for the film version of the motion picture. All or parts of the non-projector apparatus may or may not be shared between multiple projectors and/or theaters, and may be located in projection booths, multi-screen complex offices, local distribution offices, international headquarters, or wherever desired.

In the embodiment of the invention described above, registration of the projected video image with the projected film image must be fairly precise in order avoid annoying artifacts for a legitimate audience. Accordingly, it may be desirable to have the protection area appear in relatively innocuous portions of the projected image, such as in background scenery, shadowed areas, etc., or in scenes where motion obscures such artifacts. Another technique that may be used is to fade both the projected video image near its periphery and the "hole" in the film image near its inner edge, so that registration is not as critical.

If a removable media (e.g., a DVD disk) is used to provide the content for the video projector 12, it may desirable to tie the removable media to the video media so that the removable media only works with a specific film copy of a motion picture. More generally, each source media instance required for a particular screening, whether video or film, may be formed so as to reside in a subset of such media, each member of such subset being only able to operate with members of a corresponding subset of each other required media. One technique would be to "fingerprint" a pair of film and video media so as to provide a digital "ID" (e.g., a serial number) optically or magnetically encoded on the film media and readable by a suitable transducer, in known fashion. The output ID would then be coupled to the video source 18 where it would be matched with a similar ID encoded into the video media. A match of the IDs would enable the video source 18 to provide a signal to the video projector 12. Conversely, lack of a match would disable the video projector 12 from projecting a video image, causing the projected film image to be displayed with objectionable protection areas visible. When the audio portion of a motion picture is on a separate media (e.g., DVD), a similar "fingerprinting" technique may be used for copy protection.

In a variant on this embodiment, the video media may be erasable or alterable so that the video source 18 can only play the video media a pre-set number of times. For example, the video media may be a DVD-RAM media which is tied to a signal that indicates playback or use (e.g., a digital signature read from the film media during projection, or simply a "start" command for the playback unit for the media). A count can be kept of the number of times the video media has been played. Upon reaching a pre-set number of counts, the video playback unit would overwrite or otherwise alter the video media to prevent further playback. In a variation of this embodiment, the playback unit may alter or overwrite a video media immediately if the ID from a paired "fingerprinted" film version of the motion picture does not match the signature on the video media, thus preventing use of separately stolen film and video media to project a complete composite motion picture.

In still another variant, only the media copies from corresponding subsets have the information and/or data needed to substantially ensure the ability to produce acceptable and desired motion picture screenings.

Figure 2A:
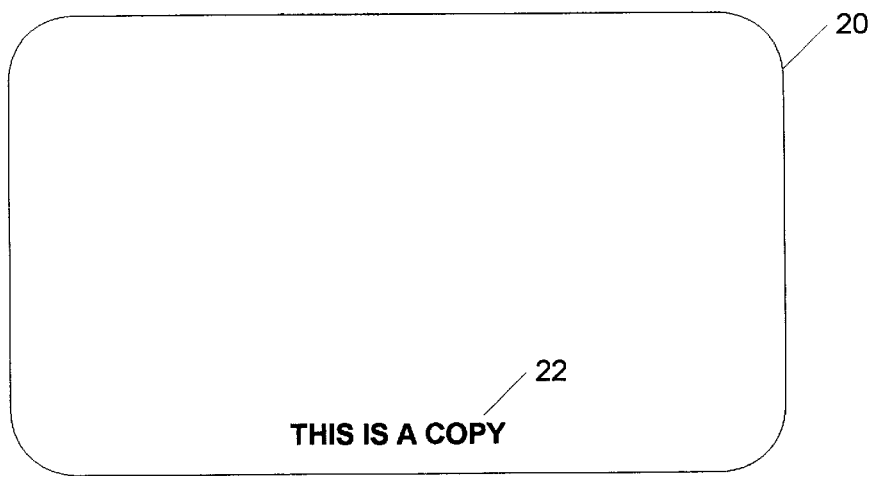
FIGS. 2A–2E are examples of an anti-theft marking system in accordance with the present invention.
Figure 2B:
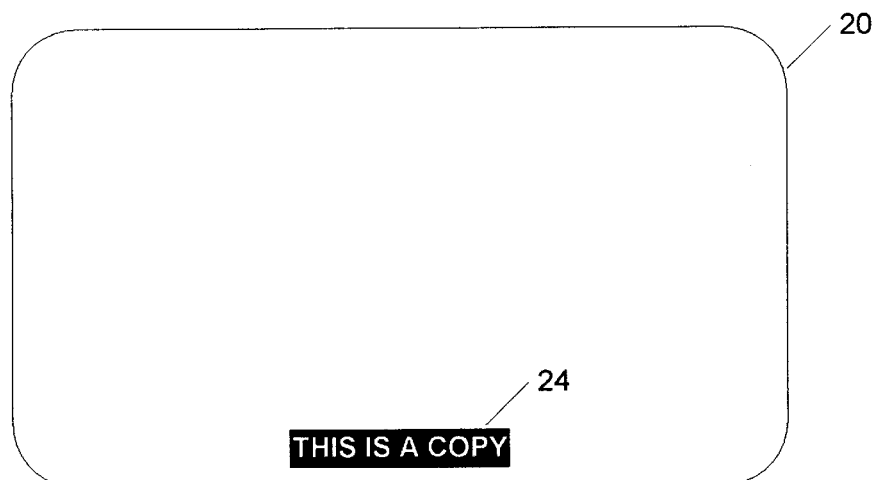
Figure 2C:
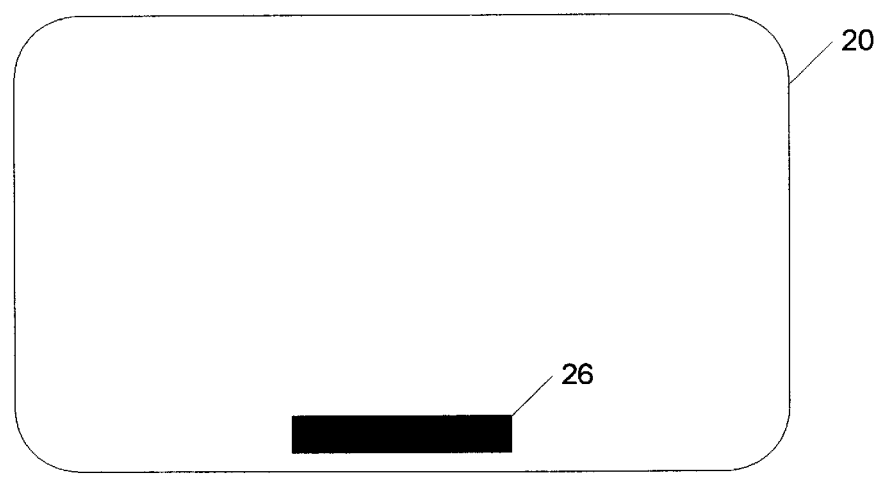

FIGS. 2A–2C are examples of an anti-theft marking system in accordance with the present invention. FIG. 2A shows a screen 20 upon which is projected a motion picture image from a film projector 10. Part of the image would comprise an alert message 22 (other elements of the image are not shown, for clarity). The alert message 22 is shown in a "positive" form. FIG. 2B shows that the video projector 12 projects onto the same screen 20 a matching "negative" version 24 of the alert message 22. The use of "negative" and "positive" alert messages can be switched or otherwise variously shared between the film version and video version of a motion picture. As used herein, a "positive" image includes the reverse of a "negative" image.

FIG. 2C shows the composite image seen by the audience. That is, the combination of the "positive" alert message 22 and the matching "negative" alert message 24 form a uniform protection area 26 in which the alert message is not visible. However, if the film version of the motion picture is stolen, the alert message will be perceived by the audience, thereby discouraging black market sales or use of video copies of the motion picture.

In order to avoid the uniform protection area 26 from itself being objectionable, the positive and negative versions of the alert message 22, 24 can be made small, placed in regions of the background where the blended composite image would be unnoticeable, or more elaborately configured such that the composite pattern can be easily inserted into the background of the film without being distracting to a legitimate audience. For example, "positive" and "negative" images can be "punched out" from an original full color film image, and the missing image information supplied by the video projector 12, so that when the composite image is "integrated" by the eye, the original image is reconstructed and the protection area becomes unrecognizable or "invisible" on the screen, no matter where positioned. The alert message may also be a symbol or icon which, if visible, would indicate that the original film has been illicitly copied. Variations of this embodiment of the invention provide that the alert message or image be present in every frame; be present periodically; be present randomly; and/or be located at different places in different frames.

Figure 2D:
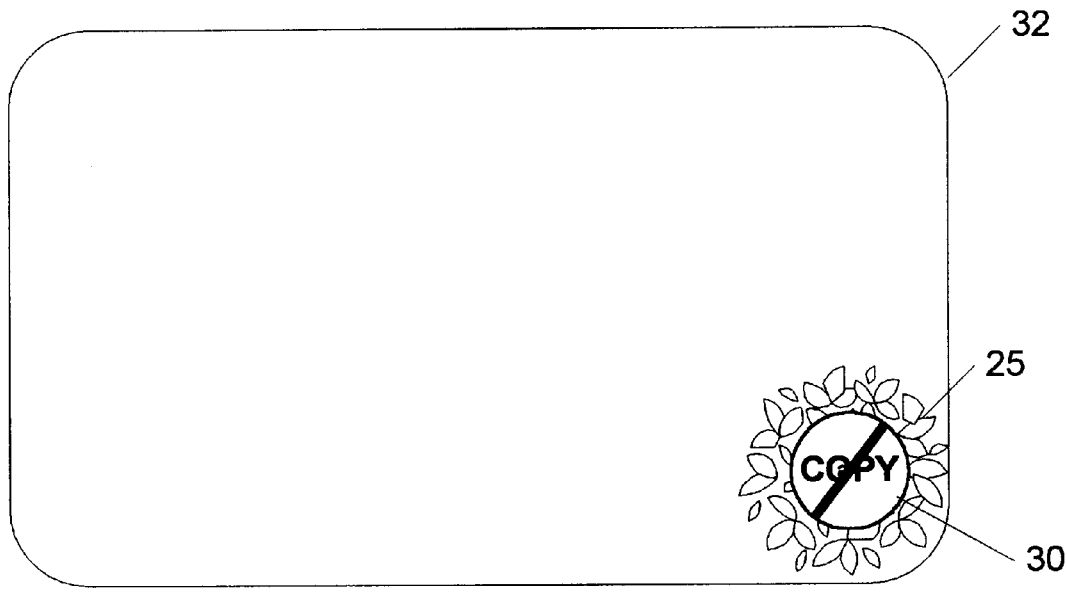
Figure 2E:
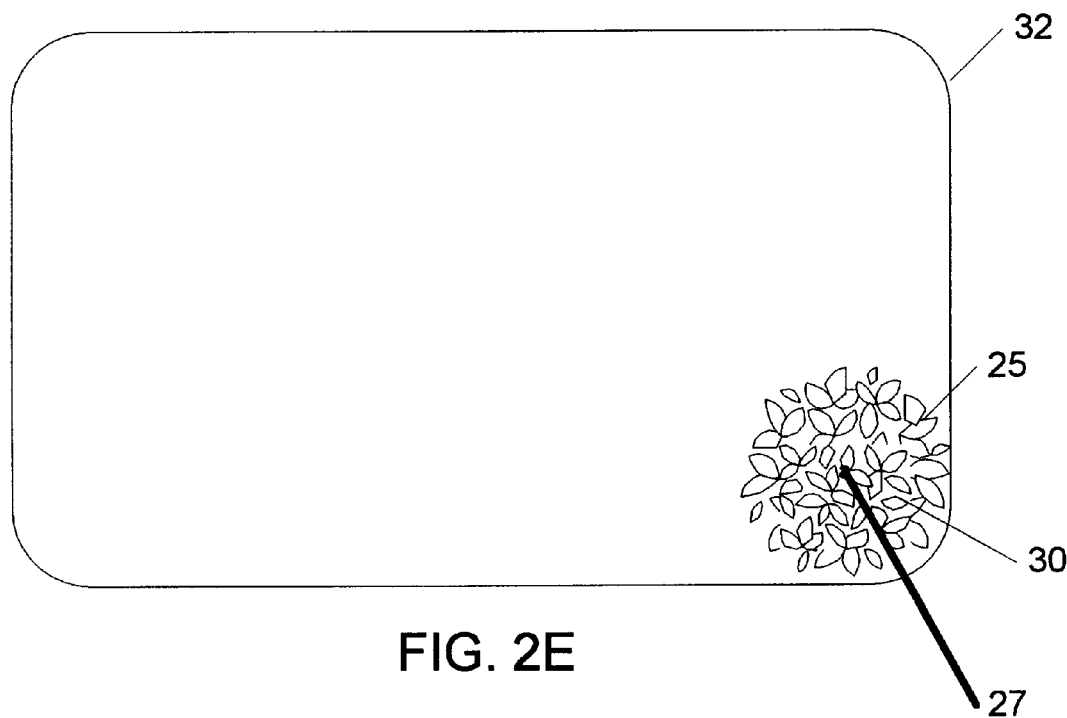

In a variation of the embodiment of the invention shown in FIGS. 2A–2C, the film version of the motion picture may have an alert message while the video projector 12 overlays a non-matching "camouflage" pattern that does not require high registration and that otherwise obscures the alert message. Thus, as shown in FIG. 2D, an alert message or symbol 30 could be projected on a screen 32 by the film projector 10 onto, for example, an area of background foliage 25, as shown in FIG. 2D. The video projector 12 may then overlay a non-matching "camouflage" foliage pattern 27 on top of the alert message 30 so as to obscure the alert message during legitimate projection of the motion picture, as shown in FIG. 2E. Again, if the film version of the motion picture is stolen, the alert message or symbol 30 will be perceived by the audience.

In another aspect of the invention, the "positive" alert message 22 and the "negative" alert message 24 need not be projected simultaneously. Film projection is generally at the rate of 24 frames per second. In between frames, a shutter obscures the light source of the film projector 10. In this embodiment of the invention, the video projector 12 can be used in synchronism with the framing rate of the film projector 10 but exactly out of phase with the "illumination" stage of the film projector 10 shutter. Thus, for example, during the projection of each film frame, the film projector 10 can project the "positive" alert message 22 in a possibly innocuous position on the theater screen. Then, between frames of the film projection, the video projector 12 can project the "negative" alert message 24 so as to be superposed over the position in the previous frame of the "positive" alert message 22. The human eye will integrate both the negative and positive versions of the alert messages 22, 24 and perceive only the composite "message-less" (or "unrecognizable" or "invisible") uniform protection area 26.

This last embodiment has value against surreptitious in-theater filming of a projected film by means of a video or film camera synchronized to the framing rate of the film. Such a camera would only see the "positive" alert message 22, and not the corresponding "negative" alert message 24, and thus the "positive" alert message 22 would be perceptible on the illicit copy. Again, the "positive" and "negative" alert messages 22, 24 need not be shown in every frame and interframe film projection interval; periodic projection or randomly-spaced occasional projection may be sufficient for copy protection purposes. Permitting discretionary display of alert messages also permits easier integration of the composite message into the background of the film so that theater audiences are not distracted by the uniform protection area 26 during legitimate projection of the motion picture.

In a variation of this last embodiment, the film is not altered to include an alert message. Instead, the video projector 12 projects at twice the rate of the film projector 10, and provides the "positive" alert message 22 in every frame and the "negative" alert message 24 in every interframe film projection interval. Again, the human eye will integrate both the negative and positive versions of the alert messages 22, 24 and perceive only the composite "message-less" uniform protection area 26. The "positive" and "negative" (and even three or more parts) images can be projected digitally at any times, even random ones, so long as they are close enough together to be "integrated". This embodiment has value against surreptitious in-theater filming of a projected film by means of a video or film camera synchronized to the framing rate of the film, or which is not capable of (or not used in a way that) lets the camera adequately imitate the integrating (and possibly other) capabilities of the human eye.

In all of the embodiments described above in which an alert message is used, the message may be customized. For example, the alert message can be as particular as "shown in X theater on Y date". The alert message can say things like "CALL XXX-XXXX FOR A REWARD", or "CONTACT XXXX-XXX TO REPORT THIS COPYRIGHT VIOLATION", or "CALL XXX-XXXX FOR FREE GIFT", where the telephone number could be dynamic depending on the screening. A static message about copyright law enforcement could also be used, possibly customized by country. Such time and place "stamping" may be useful in attempting to track down in-theater video thieves by backtracking recovered piratical video tapes to a particular copying source. Alerting audiences to the illegitimacy of the copy/screening and/or providing contact information may also discourage unauthorized copying, transfer, and/or use of the motion picture.

Figure 3A:
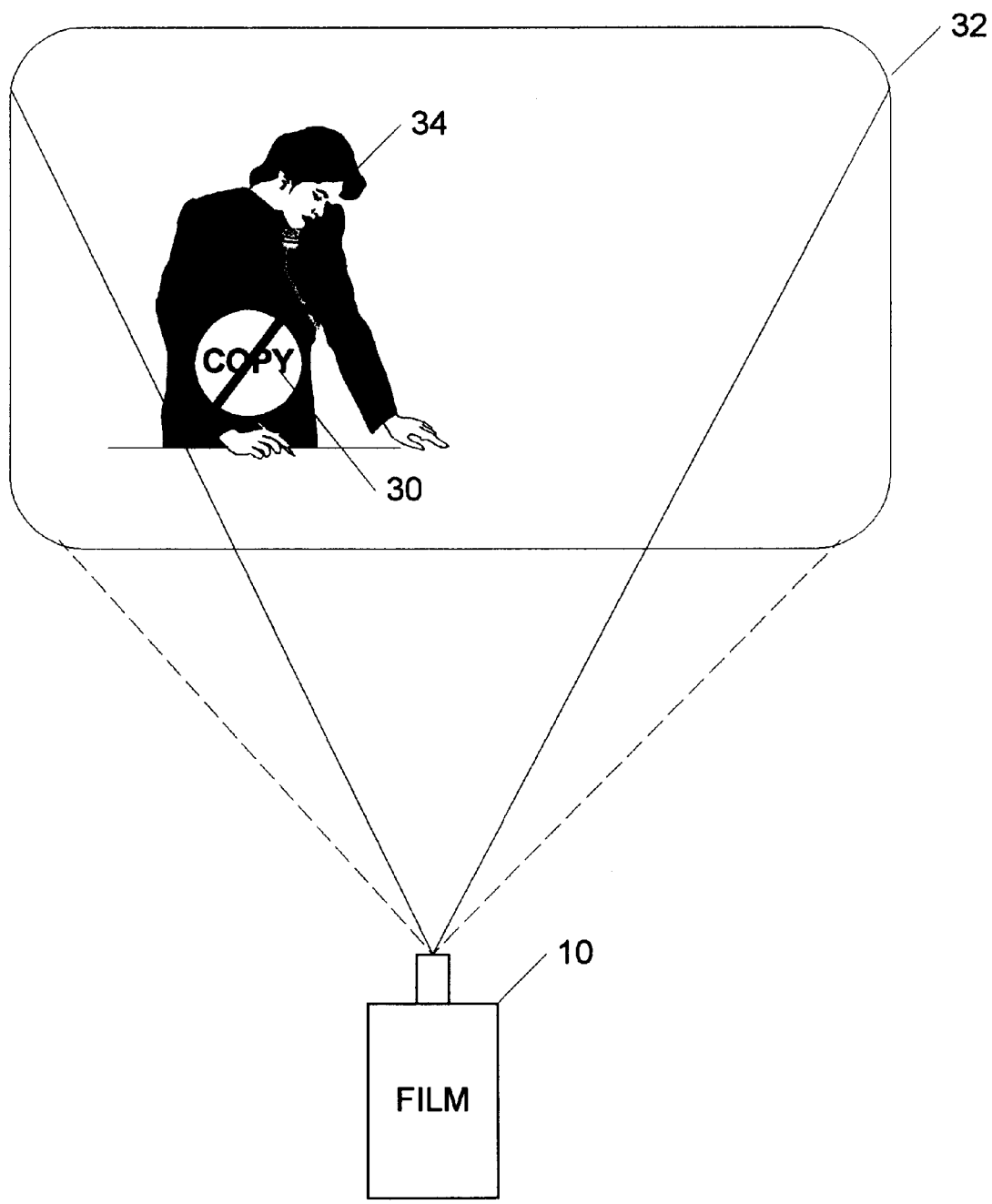
FIGS. 3A and 3B are another example of an anti-theft motion picture projection system in accordance with the present invention.
Figure 3B:
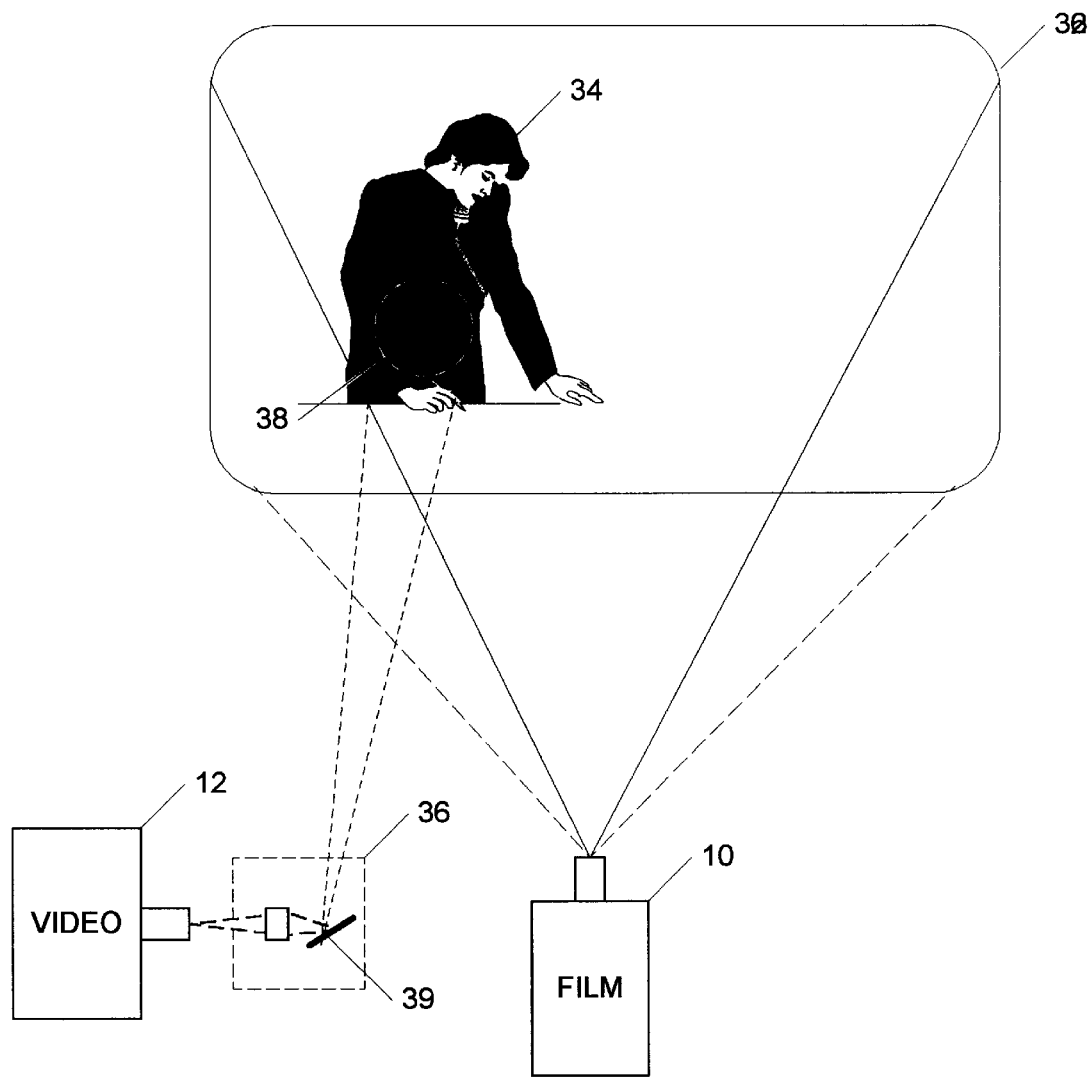

FIGS. 3A and 3B are another example of an anti-theft motion picture projection system in accordance with the present invention. FIG. 3A and 3B show the use of an alert symbol 30 projected onto a screen 32 and overlaying part of a motion picture element 34. FIG. 3A shows that the image from the film projector 10 substantially fills the screen 32. FIG. 3B shows that the image from the video projector 12 is focused and aimed by a light director unit 36 to a specific subarea 38 of the screen 32 in order to "hide" (which means camouflage and/or otherwise obscure and/or make unnoticeable and/or make unreadable the alert message) the alert message 30, as described above. Thus, the video projector 12 need not have sufficient illumination power, contrast, and resolution to provide an acceptable projected image of the motion picture that fills the entire screen 32. Rather, all of the light output of the video projector 12 is focused on the small subarea 38 of the screen 32.

The light directing unit 36 is preferably implemented as a steerable mirror and lens system that collects the light output from the video projector 12, and focuses that light onto the limited subarea 38 of the screen 32. The location of the subarea 38 on the screen 32 may be varied by angling one or more mirrors 39 within the light directing unit 36. In a simplistic version of the light directing unit 36, the mirror 39 is pivoted only in one plane, limiting display of an alert message or symbol to a single "row" or "column" of the screen 32. However, in a more sophisticated implementation, the mirror 39 may be steerable in two dimensions, allowing the illuminated subarea 38 to be located anywhere on the screen 32. Suitable actuators for such a mirror are known, and can be, for example, piezoelectric, pneumatic, or electrical actuators or motors. Control for positioning of the mirror 39 may be preset, in which case the alert message will appear in only one position on the screen 32, or may be synchronized with the film projector 10 or the video projector 12 and cued to the content of the motion picture. Thus, for example, in a first scene, an alert message can be projected in the upper left corner of the screen 32, while in a second scene, an alert message can be projected in the lower right corner of the screen 32. Feedback also allows more accurate and sure positioning of the mirror 39, possibly even varying at the framing rate.

More generally, a media that humans can experience, of whatever type that can be recorded, can be split into two or more recorded parts. The split can be made not only spatially and temporally, as above, but also spectrally and/or in terms of polarization and/or tactile information and/or scent information, as examples without limitation, so that all (or a pre-determined kind of majority) of the copy parts must be combined to be likely to create an acceptable experience. The recorded parts can be transported and/or stored separately and/or require different technology and/or equipment and/or knowledge and/or information to render.

Preferably, but optionally, alert messages contained in one or more recorded parts may be effectively canceled for the human senses so as to be unnoticeable and/or unrecognizable and/or invisible when the parts are properly combined. Canceling parts may themselves be alert messages. Commonly available sensor technology may not receive all copy parts accurately from such renderings, and the inaccuracy would preferably be noticeable and/or better yet develop an alert message.

Once installation of the embodiment shown in FIG. 1 is made in various motion picture theaters, the combination may be used for purposes other than the copy protection purposes described above. For example, the video projector 12 may be used to provide special effects for the projected film image. Such special effects may include the use of the video image to enhance the brightness, resolution, or speed of, for example, an animated character or "magic sparkle" that moves around the screen. Dynamics can be exploited, for example, in a horror film, so that the amount of gore displayed may be enhanced by adding imagery using the video projector 12, and the "gorier" version may be displayed for late-night, adult audiences, while the original, less "gory" film version of the motion picture can be shown earlier in the day to younger audiences. Thus, by adding film elements using the video projector 12, a single film can have different ratings.

As another example, if a film scene shows a billboard in the background, the video projector 12 can be used to provide different image content for the billboard, such as advertising which may, for example, show different brands of products at different screenings. As yet another example, a film may be "localized" to a local language by using the video projector 12 to insert text that would appear in a scene (e.g., a street sign or building name) in the local language. As yet another example, the video projector 12 can be used to add elements to some versions of the film that are absent from other versions. For example, in markets where smoking is widely accepted, the video projector 12 may be used to display a pack of cigarettes in a particular scene. In other versions of the film, destined for markets where cigarette smoking is less accepted, the pack of cigarettes may be omitted from the scene. Different versions of audio are also anticipated, with or without different visuals. The capabilities of the invention that allow dynamic insertion of elements permit a number of revenue and profit opportunities of these types.

Figure 4:
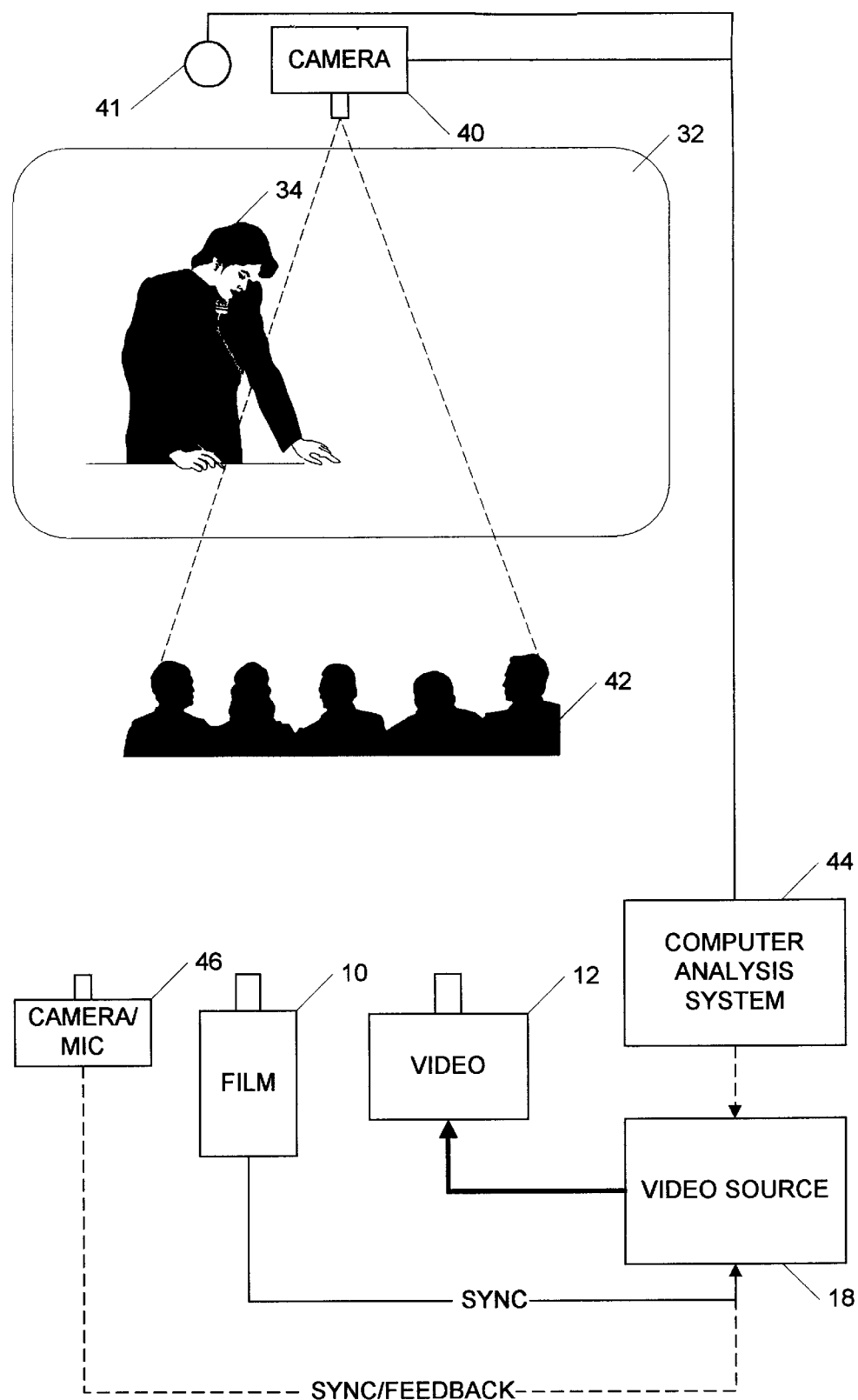
FIG. 4 is a block diagram of a motion picture system and audience feedback system in accordance with other aspects of the present invention.

FIG. 4 is a diagram of yet another embodiment of the invention. In the embodiment illustrated, a film projector 10 and video projector 12 are configured as in FIG. 1 to project a composite image onto a screen 32. Shown on the screen 32 in the illustrated embodiment is a picture element 34. In addition, a camera or other imaging device 40 (preferably of a low-light level type) and/or a microphone 41 are provided in the theater to monitor the audience 42. The camera 40 and microphone 41 may be mounted variously, such as above, in front, or behind the audience 42. The output of the camera 40 and/or microphone 41 is coupled to a computer analysis system 44, the output of which is optionally coupled to the video source 18. More than one camera 40 and/or microphone 41 may be so configured. In a preferred embodiment, the movie soundtrack is electronically canceled from the output of the microphone 41 and/or the camera input is corrected for the projected lighting, in known and/or readily conceivable.

The camera 40 and/or microphone 41 provide an audience monitoring system which can be used to obtain demographic information about the attending audience 42. The system can be used for "manned" monitoring, either locally or remotely, but is preferably used in conjunction with a pattern recognition system to determine a variety of factors or characteristics about the audience 42. For example, the computer analysis system 44 may be used to simply count the number of empty versus full seats in order to verify the number of ticket sales to a particular motion picture. More sophisticated analysis may be used to determine, for example, the adult/child ratio of the audience. This may be determined, for example, by estimating the seated height of each person in the audience, and having an arbitrary threshold height value to separate "children" from "adults", in order to get a first order approximation of the child/adult ratio. Audio feedback from the microphone 41 may be used to determine, for example, the level of laughter or other audible response of the audience 42 to particular scenes in a motion picture.

Pattern recognition algorithms also may be used to distinguish male from female faces in order to determine sex distribution, and "older" from "younger" faces in order to determine age distribution. Other information about the audience may also be determined, such as viewing habits or dynamics (e.g., the amount of time audience members face the screen 32) and/or eating habits or dynamics (e.g., the number audience members holding popcorn boxes, eating popcorn, eating in general, chewing rapidly, or that have stopped chewing). The computer analysis system 44 is preferably a suitably programmed computer, such as a personal computer, capable of implementing any one of the general algorithms described. The computer analysis system 44 may in some embodiments share resources with and/or be combined, in real-time or off-line, and in whole or in part, with other processing sites, including the video source, as already mentioned.

The output of the computer analysis system 44 may be provided to a remote location, such as a central headquarters for a film distributor, for later statistical analysis, or can be used in conjunction with the video source 18 to provide a feedback system coupled to the film projector 10 or video projector 12. Thus, for example, if the computer analysis system 44 can determine the attendance count for the audience 42, that information can be provided to the video source 18 and projected by the video projector 12 some time before, during, or after the projection of the motion picture. As another example, the image taken by the camera 40 may be re-projected through the video projector 12 onto the screen 32 so that the audience 42 may see itself recorded or transmitted, a function that seems to be popular at sporting events.

As another aspect of this embodiment of the invention, the demographic information obtained by the camera 40 and computer analysis system 44 can be used to alter the content displayed by the video projector 12. Thus, for example, if the computer analysis system 44 determines that the audience is predominantly children, the type of special effects displayed during projection of a motion picture can be altered by means of the video projector 12. In general, the video projector 12 can be used to provide or augment images in order to provide variable plot or scene elements depending upon, for example, the demographics of the audience. Also, the film speed and/or intensity and/or color and/or volume and/or sound mix and/or other parameters may be varied responsively.

An authorization scheme may be used with the audience monitoring system shown in FIG. 4 to positively allow a central site to authorize display of a complete motion picture based upon confirmation that the motion picture is being displayed at an authorized site before a legitimate audience. Such authorization may be done on a per screening basis.

As shown in FIG. 4, the video source 18 may be coupled to the film projector 10 by means of a SYNC signal so that the image displayed by the video projector 12 is synchronous with the image projected by the film projector 10. Alternatively, an audiovideo camera 46 may be provided, coupled as shown to the video source 18. The audiovideo camera 46 can be used to "listen to" or "watch" the output of the film projector 10 and provide a signal to the video source 18 from which a SYNC signal can be derived, for example, by pattern matching the sound or projected image against the recorded sound or image on the video image. As an alternative to using a microphone pickup of the theater speakers to generate a SYNC signal, the use of sound to synchronize the video projection with the film projection could be by direct electrical connection into the theater sound system.

An alternative function for the audiovideo camera 46 would be to capture the projected image on the screen 32 and provide that image to a processor within the video source 18. The processor can use the video signal from the audiovideo camera 46 to measure the brightness, color balance, alignment, planarity, focus, etc. of the projected image and adjust the output of the video projector 12. For example, if a protection area projected onto the screen 32 is perceived to be overly bright, a video feedback signal to the video source 18 permits a processor within the video source 18 to determine that such over brightness is occurring, and adjust the output of the video projector 12 accordingly to lower the brightness of the protection area. Similar functions can be utilized to adjust color balance, alignment of the protection area or video camouflage, etc.

The audiovideo camera 46 and the audience monitoring camera 40 may be one device, and either or both may included motorized position control and/or zoom functions. Multiple cameras, with or without audio capabilities, may be used.

A preferred embodiment of the present invention has been described, along with some variations. Nevertheless, it will be understood that various modifications may be made without departing from the spirit and scope of the invention. For example, a tamper-resistant chip in the video projector 12 or video source 18 can be used to keep track of the number of showings, the authorization codes, audience statistics, and film IDs. Once apparatus embodying the invention is in place, other uses may be found. For example, while an audience is awaiting presentation of a motion picture, the audience monitoring system may be used in conjunction with dynamic projection of random numbers on a theater screen to operate a bingo-type or lottery-type game. For example, a bingo winner may hold up a hand or card, and the audience monitoring system will zoom in on that person and project an image of the winner and the winning card on the screen for the audience to see. Accordingly, it is to be understood that the invention is not to be limited by the specific illustrated embodiments, but only by the scope of the appended claims.

What is claimed is:

1. A method of displaying a composite image, including:
   (a) projecting a first image having at least one portion of the image altered to provide at least one protection area;
   (b) projecting separately a second image having image content to obscure each protection area;
   wherein the first image and second image form a composite image in which each protection area is essentially hidden from the human eye.

2. The method of claim 1, wherein the composite image further includes a sequence of composite images forming a motion picture.

3. The method of claim 1, including:
   (a) providing a monitoring system for gathering information about a motion picture audience and for providing an output signal indicative of at least one selected characteristic of such audience;
   (b) applying the output signal to control display characteristics of a motion picture to the audience.

4. The method of claim 3, including applying the output signal to control displayed content of a motion picture to the audience.

5. The method of claim 3, including applying the output signal to display an image of at least a portion of the audience to the audience.

6. A method of monitoring a motion picture audience, including:
   (a) providing a monitoring system for gathering information about a motion picture audience and for providing an output signal indicative of at least one selected characteristic of such audience;
   (b) applying the output signal to control display characteristics of a motion picture to the audience.

7. The method of claim 6, including applying the output signal to control displayed content of a motion picture to the audience.

8. The method of claim 6, including applying the output signal to display an image of at least a portion of the audience to the audience.

9. A system for displaying a composite image, including:
   (a) a first projection device for projecting a first image having at least one portion of the image altered to provide at least one protection area;
   (b) a second projection device for projecting separately a second image having image content to obscure each protection area;
   wherein the first image and second image form a composite image in which each protection area is essentially hidden from the human eye.

10. The system of claim 9, wherein the composite image further includes a sequence of composite images forming a motion picture.

11. The system of claim 9, further including:
    (a) a monitoring system for gathering information about a motion picture audience and for providing an output signal indicative of at least one selected characteristic of such audience;
    (b) means for applying the output signal to control display characteristics of a motion picture to the audience.

12. The system of claim 11, wherein the output signal is applied to at least one of the first and second projection devices to control displayed content of a motion picture to the audience.

13. The system of claim 11, wherein the output signal is applied to the second projection device to display an image of at least a portion of the audience to the audience.

14. A system of monitoring a motion picture audience, including:
    (a) a monitoring system for gathering information about a motion picture audience and for providing an output signal indicative of at least one selected characteristic of such audience;

(b) means for applying the output signal to control display characteristics of a motion picture to the audience.

15. The system of claim 14, wherein the output signal is applied to at least one of the first and second projection devices to control displayed content of a motion picture to the audience.

16. The system of claim 14, wherein the output signal is applied to the second projection device to display an image of at least a portion of the audience to the audience.

* * * * *